UNITED STATES PATENT OFFICE.

FERDINAND BLUM, OF FRANKFORT-ON-THE-MAIN, GERMANY, ASSIGNOR TO PHARMACEUTISCHES INSTITUT LUDWIG WILHELM GANS, OF SAME PLACE.

HALOGEN ALBUMEN AND PROCESS OF MAKING SAME.

SPECIFICATION forming part of Letters Patent No. 678,330, dated July 9, 1901.

Application filed April 12, 1898. Serial No. 677,343. (No specimens.)

*To all whom it may concern:*

Be it known that I, FERDINAND BLUM, doctor of medicine, residing at Frankfort-on-the-Main, Germany, have invented new and useful Improvements in the Manufacture of Halogen-Albumen Bodies, of which the following is a specification.

If albumen substances or their derivatives be halogenized, (with iodin, bromin, or chlorin,) an abundant quantity of hydrogen halide (HI, HBr, HCl) is at once produced, which in part combines with the molecule of albumen and in part remains free in the solution. These not inconsiderable quantities of hydrogen halide have a decomposing action upon the albumen substances, especially when the operation takes place in the presence of heat, which is necessary in the case of bromin and iodin, while they also prevent a copious substitution of the albumen molecule with halogen; but halogen-albumen preparations are most valuable in proportion to the amount of halogen they contain in combination in the molecule and the less they are decomposed. In order to obviate both of these drawbacks which I have mentioned above as flowing from the presence of hydrogen halide, and in order to obtain preparations which are not altered by hydrogen halide and which are also abundantly endowed with halogen, I may proceed in several ways, all of which involve the destruction of the hydrogen halide produced. The operation may be conducted in a solution which is carefully continually kept neutralized, which may be effected by adding corresponding alkali to the hydrogen halide produced and then further halogenizing. Bicarbonate of soda is especially suitable for neutralizing when iodizing, because it certainly neutralizes the powerful hydrogen halide acids, but does not combine the iodin like the alkalies, so that an excess does not cause any harm. I may likewise carry out the process by halogenization and decomposing or neutralizing the presence of the hydrogen halides or their salts by means of a galvanic current. In this manner halogen is produced in the nascent state, which acts at once upon surrounding albumen. The hydrogen halide produced in this reaction is decomposed anew by the electric current, so that it cannot exert any injurious action upon the albumen molecule. In this manner fluorin may also be caused to act upon albumen, and thus products are obtained which contain fluorin combined in the molecule.

It is obvious that by the above-described modes of carrying out my process all the albumen substances, (albumens, albumoses, peptones, albumenoids, &c.,) as also their derivatives, so far as they still bear an albuminous character, such as divisional products, which give the reactions of albumen, (biuret reactions, Millon's reactions, &c.,) can be halogenized. In contradistinction to the halogen-albumen products that are obtained without neutralizing the hydrogen halide, whether halogen is allowed to act until complete saturation or not, the preparations which I thus produce represent not only derivatives which are not decomposed by acid, but they also contain a larger percentage of substituted halogen. For example, by allowing iodin to act upon casein or casein-alkali the mixture becomes acid; but iodin-casein, which has been produced by adding iodin until there is a quantity of permanently-free iodin in the mixture, contains scarcely one per cent. of iodin combined in the molecule. The greater part of the iodin is in a state of admixture either mechanically or in the form of hydrogen iodid; but if now the hydrogen iodid be neutralized, then a further absorption of iodin takes place, which is indicated not only by the disappearance of the added iodin, but also by the "rising" of the iodin which has entered (being substituted) in the albumen molecule. If alkali is not allowed to flow into the mixture continuously, but iodin is added each time until saturation and the mixture be then neutralized, then it must be neutralized six times at least until no more iodin is taken up. The product finally produced contains six to seven per cent. of iodin in substitution in the albumen molecule, and if it be decomposed with alkali a divisional product is obtained containing fifteen to sixteen per cent. of iodin, whereas in the known bodies of this class far less iodin was substituted, because the process began with less-abundantly-substituted iodin-albumen substance.

In iodizing the preferable procedure is to mix a solution of albumen with bicarbonate of soda and iodin or in iodizing to allow soda-lye to flow in slowly while constantly testing with litmus-paper. When the mixture does not take up any more iodin permanently, it can be precipitated with acid (preferably acetic acid, because it does not decompose the NaI produced) and then washed cold and hot in water and alcohol and dried, or the soda salt of the respective albumen is precipitated by means of acetone or alcohol, whereby the excess of iodin and iodid of soda is at the same time removed. The various albumen substances, which are substituted with iodin in this abundant manner, contain considerably higher amounts of iodin than could be otherwise obtained. The casein product contains up to about seven per cent. of iodin. The egg-albumen product contains up to about six per cent. of iodin, and the peptone product contains up to about two per cent. of iodin. The iodin-albumen substances still show for the greater part the biuret reaction, while Millon's reaction does not occur by reason of the presence of iodin. The albumen which has been decomposed by acids or alkalies, so far as it still shows the characteristics of albumen, (as above mentioned, viz.,) contains, by the copious substitution with iodin, up to thirteen to sixteen per cent. of iodin. The iodizing operation is effected preferably in heat 80° to 90° centigrade.

The bromizing results are quite analogous. In this case also the substances must be neutralized several times and bromin must be allowed to act further in order to produce higher substitution values of bromin and to obviate decomposition. The bromizing operation is successful to a sufficient degree at about 50° centigrade. The amounts of bromin consumed amount in the case referred to to about fifty per cent. of the weight of the egg-albumen. Of this considerably over forty per cent. is converted into H Br by oxidation of the albumen molecule, and only a small portion enters into the molecule.

The production of chlorin-albumen may be effected in the cold, otherwise it is analogous to the process for the production of the products of bromin and iodin, only in this case neutralization must be effected with double care, because strong hydrochloric acid (HCl) not only produces decompositions, but also by reason of considerable precipitates would otherwise remove by simple mechanical action a portion of the albumen from the copious chlorination.

The chlorin derivatives of the mentioned albumen substances contain up to about two per cent. of chlorin. If they are decomposed, products containing four and more per cent. of chlorin are produced. The production of halogen-albumen substances by electrochemical process takes place as follows: For example, fluorin albumen is obtained by adding fluorid of ammonium to a solution of albumen and then passing a current through it. One hundred grams of egg-albumen dissolved in one liter of water are mixed with twenty grams of flourid of ammonium and then a current of a strength of ten amperes is passed through the mixture. The electrodes may be three by five centimeters in dimension. The internal resistance is very great, so that the active current is only two amperes. The battery is disconnected after twenty-four hours. The product thus obtained is an undecomposed fluorin albumen, which, after purification, contains up to about one per cent. of fluorin firmly combined in the albumen molecule. In the same manner other albumen substances can be employed with fluorin.

For the purpose of chlorinating, bromizing, and iodizing by electrochemical process with the object of producing highly-substituted albumen derivatives that are not further altered the procedure is exactly the same as in the case of fluorin, and if only sufficient halogen has been present there is produced, according to the duration of the action of the current, a halogen substitution product of albumen which considerably exceeds as regards its percentage of organic halogen the albumen which has been halogenized up to simple saturation. The new substances are characterized by the following properties: They are slightly-yellow amorphous powders, containing about ten per cent. of water, which is driven off if they be dried at about 110° centigrade. They are easily soluble in water, particularly in the presence of heat. Treated with a small amount of water in the presence of cold they swell and become gelatinous. They are also soluble in dilute spirit, but less soluble than in water, insoluble in strong alcohol, ether, benzene, and the like. If treated with caustic lyes in the cold, no change takes place; but by heating them with those reagents they are decomposed, and a smell like glue will be observed. From the aqueous solution the new substances may be again precipitated in flocculent form by the addition of acids. The flakes thus obtained are but difficultly soluble in cold water, insoluble in dilute salt solution, and conglobate, if heated. These products are employed for medicinal purposes in the same manner as other halogen-albumen substances, and they have a more energetic action.

Now what I claim, and desire to secure by Letters Patent, is the following:

1. The process of producing halogen albumens containing an increased percentage of organic halogen which consists in halogenizing an albuminous substance in a continuous manner and neutralizing the intermediate hydrogen halides formed in the halogenization.

2. The process of producing halogen albumens containing an increased percentage of organic halogen which consists in halogenizing an albuminous substance in a continuous manner with nascent halide and neutralizing the intermediate hydrogen halides formed in the halogenization by decomposing the same as they are formed, by passing an electric current through the mass to effect the halogenization and neutralization.

3. A halogen-albumen body consisting of slightly-yellow amorphous powder containing about ten per cent. of water, the said body being freely soluble in water, less soluble in dilute spirit, insoluble in strong alcohol, ether, benzene and the like, and when in aqueous solution precipitated in floccula by acids which flocculæ are difficultly soluble in cold water, insoluble in dilute salt solution and conglobate if heated.

4. As a new article of manufacture, an undecomposed fluorin-albumen body.

In testimony whereof I have signed my name to this specification in the presence of two subscribing witnesses.

FERDINAND BLUM.

Witnesses:
  JEAN GRUND,
  FRANK H. MASON.